United States Patent Office 3,699,101
Patented Oct. 17, 1972

---

3,699,101
N-(3-HALO - 5,5-DIALKYL-CYCLOHEX-2-EN-1-YLIDENE) MORPHOLINIUM TETRAPHENYL BORATES
Gerhard H. Alt, St. Louis, Mo., assignor to Monsanto Company, St. Louis, Mo.
No Drawing. Filed Feb. 13, 1970, Ser. No. 11,329
Int. Cl. C07d 87/30
U.S. Cl. 260—247                                    3 Claims

ABSTRACT OF THE DISCLOSURE

N-heterocyclic substituted (3-halo-5,5-dialkylcyclohex-2-en-1-ylidene) tetraphenyl borates for use in combating helminthiasis in animals, particularly ruminants.

---

This invention relates to the anthelmintic usage of N-heterocyclic substituted (3-halo-5,5-dialkyl-cyclohex-2-en-1-ylidene) tetraphenyl borates of the formula

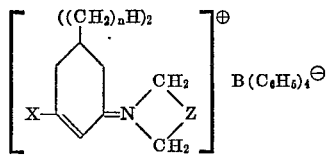

wherein $n$ is a whole number from 1 to 2, inclusive, but preferably 1, wherein X is halogen of atomic weight in the range of 35 to 80, that is chloro or bromo, but preferably chloro, and wherein Z is —CH$_2$CH$_2$—, —CH$_2$CH$_2$CH$_2$—, —CH$_2$SCH$_2$—, or, and preferably, —CH$_2$OCH$_2$—.

These anthelmintic compounds are readily prepared by mixing in hot methanol or ethanol or mixtures thereof to react equimolecular proportions of sodium tetraphenyl borate, NaB(C$_6$H$_5$)$_4$, and an N-heterocyclic substituted (3 - halo - 5,5 - dialkyl - cyclohex - 2 - en - 1 - ylidene) perchlorate of the formula

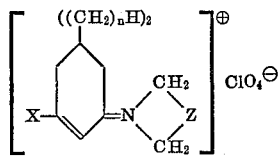

whesrein $n$, X and Z have the aforedescribed respective significances, and thereafter separating by conventional means the N-heterocyclic substituted (3-halo-5,5-dialkyl-cyclohex-2-en-1-ylidene) tetraphenyl borate so produced. These perchlorate precursors are known and their methods of preparation well described (U.S. 3,428,633 and Alt et al., J. Org. Chem., vol. 29, pp. 794–7, 1964) by heating in water sodium perchlorate or perchloric acid with the chloride or bromide salt reaction product of trichloroacetyl chloride or bromide and enaminoketone of the formula

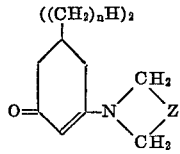

wherein $n$ and Z have the aforedescribed respective significances. These enaminoketone precursors are well known and are readily prepared by refluxing in benzene an equimolecular mixture of 5,5-dimethyl- or 5,5-diethyl-cyclohexane-1,3-dione and an N-heterocyclic compound of the formula

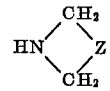

wherein Z has the aforedescribed significance, exemplary of which latter reactants being pyrrolidine, piperidine, morpholine and thiomorpholine.

To illustrate the preparation of these anthelmintics but not limitative thereof is the following:

EXAMPLE 1

To a suitable reaction vessel equipped with a thermometer and agitator is charged a solution of approximately 72 parts by weight of white solid N-(3-chloro-5,5-dimethyl-cyclohex-2-en-1-ylidene) morpholinium perchlorate in approximately 320 parts by weight of hot methanol. To this hot solution, and with agitation, is slowly added a hot solution of approximately 75 parts by weight of sodium tetraphenyl borate in approximately 200 parts by weight of ethanol. Thereafter the reaction mass is cooled to room temperature, and the precipitate filtered off and dried. The dried product, a pale yellow powder, is N-(3-chloro-5,5-dimethyl-cyclohex-2-en-1-ylidene) morpholinium tetraphenyl borate, melting at 163–5° C.

EXAMPLE 2

Employing the procedure of Example 1 but replacing N-(3-chloro-5,5-dimethyl-cyclohex-2-en-1-ylidene) morpholinium perchlorate with an equimolecular amount of N-(3-chloro-5,5-dimethyl-cyclohex-2-en-1-ylidene) pyrrolidinium perchlorate there is obtained solid N-(3-chloro-5,5-dimethyl-cyclohex-2-en-1-ylidene) pyrrolidinium tetraphenyl borate.

EXAMPLE 3

Employing the procedure of Example 1 but replacing N-(3-chloro-5,5-dimethyl-cyclohex-2-en-1-ylidene) morpholinium perchlorate with an equimolecular amount of N-(3-bromo-5,5-diethyl-cyclohex-2-en-1-ylidene) morpholinium perchlorate there is obtained solid N-(3-bromo-5,5-diethyl-cyclohex-2-en-1-ylidene) morpholinium tetraphenyl borate.

In a similar manner the following solid anthelmintics of this invention are prepared N-(3-chloro-5,5-diethyl-cyclohex-2-en-1-ylidene) morpholinium tetraphenyl borate,
N-(3-chloro-5,5-dimethyl-cyclohex-2-en-1-ylidene) piperidinium tetraphenyl borate,
N-(3-chloro-5,5-dimethyl-cyclohex-2-en-1-ylidene) thiomorpholinium tetraphenyl borate,
N-(3-bromo-5,5-dimethyl-cyclohex-2-en-1-ylidene) pyrrolidinium tetraphenyl borate,
N-(3-bromo-5,5-diethyl-cyclohex-2-en-1-ylidene) piperidinium tetraphenyl borate, and the like, from sodium tetraphenyl borate and the appropriate N-heterocyclic substituted (3-halo-5,5-dialkyl-cyclohex-2-en-1-ylidene) perchlorate.

These N-heterocyclic substituted tetraphenyl borates are anthelmintics, that is they are useful in combating helminthiasis in animals susceptible to or suffering from an infestation in their gastrointestinal tract with parasitic worms of the phyla Nemathelminthes and Platyhelminthes, the member species of which phyla are generally termed helminths. Parasitic worms of the phylum Platyhelminthes which infest the digestive systems of animals include tapeworm species of the class Cestoidea and fluke species of the class Trematoda, which parasitic worms are often termed flatworms, a particularly injurious helminth species being *Taenia saginata*. Parasitic worms of the phylum Nemathelminthes which infest the digestive systems of animals include round worms of the class Nematoda, particularly such species as *Ascaris suum*, *Syphacea obvelata* and the economically important *Haemonchus contortus* of ruminants. This invention is particularly concerned with combating this latter helminth species amongst others of the phylum Nemathelminthes in ruminants.

The term "animal" as employed herein and in the appended claims includes, for example, the ruminants such as deer, goats, sheep and cattle, the monogastrics such as swine, rabbits, dogs, cats, and hamsters, poultry such as chickens, turkeys, geese, ducks, guinea fowl, pigeons and pheasants and birds such as parrots, canaries, parakeets, and the like, which are susceptible to helminthiasis.

The method of combating helminthiasis in an animal in accordance with this invention involves contacting the helminth in the body of the animal by administering thereto an anthelmintically effective amount of an N-heterocyclic substituted tetraphenyl borate aforedescribed. These compounds are somewhat soluble in organic solvents and are adapted to be administered to animals. The compounds can be employed in admixture with grain rations or animal feeds. They can be administered continuously or intermittently in dosages sufficient to protect the animal from the attack of helminthes without in any way causing detriment to the animal.

The administration or feeding of an effective dosage of at least one of the compounds of this invention to be employed according to the present invention is essential and critical for the practice of this invention. The amount of one or more of these borates which will constitute an effective anthelmintic dosage varies considerably and is dependent upon such factors as the animal concerned, the age of the animal, the helminth against which protection is sought, the life state of such organism against which protection is sought, the particular borate compound employed, and the like. In general, good results are obtained when there is administered to animal a dosage of from 0.01 to 1,000 milligrams of one of the compound per kilogram of body weight and preferably from 0.01 to 500 milligrams per kilogram of body weight. Where the compound of this invention is administered on a daily schedule, good results are obtained when employing daily dosages of from 0.01 to 150 milligrams or more of one of the compounds per kilogram of animal body weight. Where helminth control is the main objective of treatment and the danger of reexposure to the attack of intestinal parasites from contaminated feed or surrounding is low, good results are obtained when there is administered to an animal a daily dosage of from 0.5 to 50 milligrams or more per kilogram of body weight. Where such danger of reexposure is very low, good results are frequently obtained when an animal is dosed on a single occasion with from 2.5 to 1,000 milligrams of one of the compounds of this invention per kilogram of body weight.

The method of the present invention can be carried out by administration or feeding of these borate compounds per se of this invention. However, the present invention embraces the employment of any liquid, powder, mash, drench, bolus, pellet, capsule or other animal food containing one or more of these compounds. In such usage, the compounds of this invention can be modified with one or more of a plurality of additaments or innocuous ingestible adjuvants including water, ethanol, skim milk, edible oils, propylene glycol, syrups, grain rations, surface active dispersing agents such as the liquid and solid emulsifying agents, and edible solid carriers such as edible powders and commercial animal feeds, concentrates or supplements. By "commercial animal feeds, concentrates or supplements" are meant the partial and complete animal feeds containing desirable amounts of minerals, vitamins, antioxidants, antibiotics and growth stimulants. In such animal feed compositions, the adjuvant cooperates with the active agent so as to facilitate the invention and obtain an improved result. Further, the compositions are adapted to be fed to animals to supply the desired dosage of active agent, or to be employed as concentrates and subsequently diluted with additional carrier or adjuvant to produce the ultimate compositions.

The active material of this invention can also be dispersed, with or without vitamin, mineral, or other feed supplements, upon a material, such as sphagnum moss, which serves as an edible mechanical support or roughage. The resulting treated material is employed as, or in addition to, other animal feed, or supplied to young nursing animals not yet feeding on the feed ration normally fed to the adult animals.

The exact concentration of the compounds of this invention to be employed in the compositions can vary provided that enough of the composition is ingested by the animal so as to provide the required internal anthelmintic amount of active ingredient. For examples, where direct administration to the individual animal is preferred, liquid or solid compositions containing from 0.5 to 98 percent by weight of one or more of the agents of this invention conveniently are employed to supply the desired dosage. Representative of this type of composition is the relatively concentrated composition containing one of the active agents of this invention and nutritive supplementary materials, which composition is provided for the ad libitum consumption by animals, that is a "salt-block" type of composition. Also representative of such compositions is a slow-release type of composition containing one of these new active agents in the form of small pellets or granules which are administered orally and which lodge internally and release their contents over an extended period of time. Where one or more of the compounds of this invention is provided as a constituent of the principal food or water ration, satisfactory results are obtained with rations containing a minor but effective amount of the new anthelmintic compounds. The exact amounts of these compounds in the ration or drinking water are dependent upon the food and water consumption and feeding and watering habits of the animal concerned. In animal feeds, the required dosage can be supplied with feeds containing at least 0.0001 percent or more and usually from 0.0001 to 0.5 percent by weight of active material. When fed as the principal food ration, the required dosage is conveniently supplied with feeds containing from 0.0001 to 0.3 percent by weight of active material.

As illustrative of this invention but not limitative thereof is the following:

The anthelmintic activity of these N-heterocyclic substituted (3 - halo - 5,5 - dialkyl - cyclohex - 2 - en - 1-ylidene) tetraphenyl borates is illustrated by the following method in which the reduction in fecal egg count was used as the criteria for reduction of the parasite burden. Three male sheep were equally infested with larvae of *Haemonchus contortus*. The sheep faeces were examined at intervals for eggs of *Haemonchus contortus* to insure that infestation had occurred. Approximately thirty-six (36) days after this infestation two of these sheep were respectively dosed with N-(3-chloro-5,5-dimethyl - cyclohex - 2 - en - 1 - ylidene) morpholinium tetraphenyl borate at a rate of 100 mg. per kg. of body weight. The third untreated sheep served as a control to confirm that *Haemonchus contortus* eggs were continually produced throughout the evaluation period. Reduction in fecal eggs was determined by counting the number of eggs per gram of sheep faeces passed six days immediately following said dosing and then comparing the average number of eggs per gram of faeces passed from the two treated sheep to the average number of eggs per gram of faeces said two sheep passed on the day of their dosing. The average reduction in egg count from the two treated sheep was 100 percent. Employing the same procedure but employing tetramethyl ammonium tetraphenyl borate, $(CH_3)_4N^{\oplus}B(C_6H_5)^{\ominus}$, at the same rate of 100 mg. per kg. of body weight there was no reduction in egg count.

While this invention has been described with respect to certain embodiments it is to be understood that it is not so limited and that variations and modification thereof obvious to those skilled in the art can be made without departing from the spirit or scope of this invention.

What is claimed is:

1. A compound of the formula

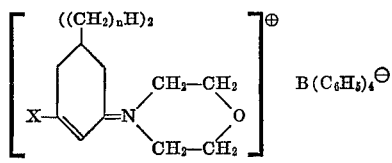

wherein $n$ is a whole number from 1 to 2, inclusive, and X is chloro or bromo.

2. A compound of claim 1 wherein X is chloro.
3. The compound of claim 2 wherein $n$ is 1.

References Cited

UNITED STATES PATENTS 3,428,633  2/1969  Speziale et al. _____ 260—247

OTHER REFERENCES

Nezu, Hiroyuki: Chemical Abstracts, vol. 56, p. 26 (1962).

Tsunetoshi, Kaito, et al.: Chemical Abstracts, vol. 61, p. 2490.

ALEX MAZEL, Primary Examiner

J. TOVAR, Assistant Examiner

U.S. Cl. X.R.

260—243 B, 293.65, 326.8; 424—248